United States Patent
Sakuma et al.

(10) Patent No.: US 7,282,534 B2
(45) Date of Patent: Oct. 16, 2007

(54) POLYPHENYLENE ETHER RESIN COMPOSITION

(75) Inventors: Teruaki Sakuma, Chiba (JP); Akira Mitsui, Chiba (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/517,833

(22) PCT Filed: Jul. 15, 2003

(86) PCT No.: PCT/JP03/08960

§ 371 (c)(1),
(2), (4) Date: Dec. 15, 2004

(87) PCT Pub. No.: WO2004/007613

PCT Pub. Date: Jan. 22, 2004

(65) Prior Publication Data

US 2005/0228123 A1 Oct. 13, 2005

(30) Foreign Application Priority Data

Jul. 17, 2002 (JP) ............................. 2002-208583

(51) Int. Cl.
 *C08L 71/12* (2006.01)
 *C08G 65/38* (2006.01)
(52) U.S. Cl. ...................... 524/611; 524/508; 528/214; 528/215; 528/218

(58) Field of Classification Search ................. 524/611, 524/508; 528/214–215, 218
See application file for complete search history.

(56) References Cited

U.S. PATENT DOCUMENTS 4,788,277 A * 11/1988 Ibe et al. .................... 528/215

FOREIGN PATENT DOCUMENTS

| JP | 52-144098 A | 12/1977 |
| JP | 10-204173 A | 8/1998 |
| JP | 11-181199 A | 7/1999 |
| JP | 11-286542 A | 10/1999 |

* cited by examiner

Primary Examiner—Peter Szekely
(74) Attorney, Agent, or Firm—Finnegan, Henderson, Farabow, Garrett & Dunner, L.L.P.

(57) ABSTRACT

A resin composition comprising a polyphenylene ether produced by polymerizing a monomer component consisting of 100 parts by weight of 2,6-dimethylphenol and 0.5 to 7.5 parts by weight of o-cresol in the presence of both a catalyst and an oxygen-containing gas and a flame retardant. When the polyphenylene ether has a molecular weight distribution of 2.8 to 8.0, the resulting resin composition is more excellent in flame retardance, particularly anti-dripping properties in burning. The resin composition is applicable to not only electric and electronic applications necessitating high flame retardance but also other fields of application of polyphenylene ether resins.

11 Claims, No Drawings

POLYPHENYLENE ETHER RESIN COMPOSITION

TECHNICAL FIELD

The present invention relates to a flame retardant composition that provides a resin composition having excellent flame retardancy, and to a flame retardant resin composition obtained thereby.

BACKGROUND ART

Polyphenylene ether resins have been known to be very useful engineering plastic materials because of their good mechanical properties, electric properties and thermal resistance. Electric machines and appliances used at home have been strongly required to have high flame retardancy in order to prevent an accident such as a fire and an electric shock caused thereby. According to an increasing demand for electric machines and appliances, the demand for plastic materials used in this field having a high flame retardancy also has been increasing.

Various methods for imparting a flame retardant property to a polyphenylene ether resin have been proposed. For example, there have been proposed methods for adding halogen compounds or phosphorus compounds such as a phosphate ester. However, a halogen compound generates fumes or a corrosive hydrogen halide in a molding process, and in some cases causes problems of toxicity and to the environment. Moreover, the conventionally proposed methods disadvantageously deteriorate the impact resistance and high heat deflection temperature inherent in a polyphenylene ether resin.

It is known that the addition of an aromatic phosphate ester imparts an efficient self-extinguishing property to a resin composition. Such a self-extinguishing resin composition, however, often has been disqualified at V-0 or V-1 in the UL94 burning test because of dripping from a specimen during or after burning or luminous burning thereof. Even a resin composition which satisfies the V-0 level, can be disqualified at the 5V level of UL94 test, i.e., a plaque test.

It is known that a composition with flame retardancy and anti-dripping properties can be obtained by adding polytetrafluoroethylene resin (which will hereinafter be abbreviated as "PTFE") to a polyphenylene ether resin as described in U.S. Pat. Nos. 4,107,232 and 4,332,714 and JP-A-59-98158 (the term "JP-A" used herein means an unexamined Japanese patent publication"). PTFE is known to provide great improvement in the anti-dripping properties and friction properties of a thermoplastic resin by it being added in a small amount to the thermoplastic resin.

Generally, when PTFE is added to a thermoplastic resin, both are kneaded at a temperature lower than the melting point of PTFE, since the melting point of PTFE is higher than the processing temperature of the thermoplastic resin. PTFE is easily fiberized or agglomerated by the shearing forces created. Therefore, the PTFE kneaded into the thermoplastic resin is fiberized and forms a network therein so that effects such as anti-dripping properties are exhibited. However, that PTFE is easy to fiberize or agglomerate makes the handling of PTFE difficult, and various methods for improving the handling thereof have been proposed. For example, JP-A-10-30046 discloses a method comprising treating the PTFE with a dispersant agent such as a higher fatty acid before use.

PTFE usually has a powdery form, and therefore, if it used in the form of powder, it disperses and pollutes working areas. When it is mixed with a thermoplastic resin or fed to an extruder, PTFE causes, as a result of its above-mentioned properties, a blocking phenomenon wherein the PTFE agglomerates and adheres to the wall of a feeding apparatus or an extruder which makes stable feeding and kneading difficult, and clogs a filter located at the die head of the extruder and obstructs extrusion. When a resin composition obtained thereby is molded, the resultant molded article often has agglomerates of PTFE on its surface because of the poor dispersibility of the PTFE, causing problems such as deterioration of its impact resistance.

On the other hand, in order to improve the handling of PTFE, investigation of pelletized compositions containing PTFE at a high concentration has been made and such a granular PTFE composition has been disclosed in various documents such as JP-A-9-324124, JP-A-9-324071, JP-A-9-324072, JP-A-9-324073, JP-A-9-324074, JP-A-9-324092 and JP-A-9-324093. However, the PTFE disclosed in these documents does not have enough dispersibility, and is difficult to extrusion knead for a long time and it inhibits performance of the resin composition.

As described above, the prior art for imparting flame retardancy to a polyphenylene ether resin has problems such difficulty in handling and insufficient flame retardancy. Moreover, PTFE used to inhibit dripping upon burning has many problems in physical properties such as poor handling property and adhesion to processing apparatus. Thus, improvement has been required.

DISCLOSURE OF THE INVENTION

An object of the present invention is to provide a composition having good flame retardancy, especially anti-dripping properties, i.e., no dripping of the resin upon burning.

With a view to achieving the above-described object, the present inventors have made extensive investigation, and accomplished the present invention.

The present invention therefore provides:

1. A resin composition comprising a polyphenylene ether and a flame retardant, wherein said polyphenylene ether is obtained by polymerizing a monomer comprising 100 parts by weight of 2,6-dimethylphenol and 0.5-7.5 parts by weight of ortho cresol in the presence of a catalyst and an oxygen-containing gas.

2. The resin composition according to item 1 above, wherein said polyphenylene ether has a molecular weight distribution of 2.8-8.0.

3. The resin composition according to item 1 above, wherein said resin composition further includes a styrene resin.

4. The resin composition according to item 3 above, which comprises 5-95 parts by weight of the polyphenylene ether, 95-5 parts by weight of the styrene resin and 1-30 parts by weight, based on 100 parts by weight of the polyphenylene ether and the styrene resin, of the flame retardant.

5. The resin composition according to item 1 above, wherein said flame retardant is at least one compound selected from the group consisting of a halogen compound, a silicone compound and a phosphorous compound.

6. A process for producing a resin composition comprising a polyphenylene ether and a flame retardant, which comprises:
polymerizing a monomer comprising 100 parts by weight of 2,6-dimethylphenol and 0.5-7.5 parts by weight of ortho cresol in the presence of a catalyst and an oxygen-containing gas to obtain a polyphenylene ether, and
mixing said polyphenylene ether with a flame retardant.

7. The process according to item 6 above, wherein said monomer is 2,6-dimethylphenol containing ortho cresol.

8. The process according to item 6 above, wherein said 2,6-dimethylphenol and said ortho cresol are separately fed.

9. The process according to item 6 above, wherein said catalyst comprises a copper compound, a halogen compound and a diamine compound represented by the following formula (1):

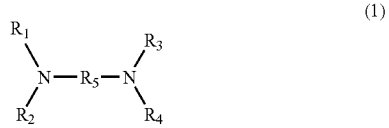

wherein $R_1$, $R_2$, $R_3$ and $R_4$ each independently represents a hydrogen or a linear or branched $C_{1-6}$ alkyl group, with the proviso that they do not represent hydrogen at the same time; and $R_5$ represents a linear or methyl-branched $C_{2-5}$ alkylene group.

10. The process according to item 9 above, wherein said catalyst further comprises at least one of a tertiary monoamine compound and a secondary monoamine compound.

11. A polyphenylene ether having molecular weight distribution of 2.8-8.0, which is obtained by polymerizing a monomer comprising 100 parts by weight of 2,6-dimethylphenol and 0.5-7.5 parts by weight of ortho cresol in the presence of an oxygen-containing gas and a catalyst comprising a copper compound, a halogen compound and a diamine compound represented by the following formula (1):

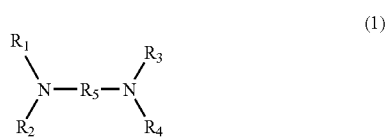

wherein $R_1$, $R_2$, $R_3$ and $R_4$ each independently represents hydrogen or a linear or branched $C_{1-6}$ alkyl group, with the proviso that they do not represent hydrogen at the same time; and $R_5$ represents a linear or methyl-branched $C_{2-5}$ alkylene group.

BEST MODE FOR CARRYING OUT THE INVENTION

The polyphenylene ether of the present invention is obtained by polymerizing a monomer comprising 100 parts by weight of 2,6-dimethylphenol and 0.5-7.5 parts by weight of ortho cresol. The amount of ortho cresol in the monomer is not less than 0.5 parts by weight, preferably not less than 1.0 part by weight, and more preferably not less than 3.0 parts by weight, for providing an anti-dripping property upon burning, which is the effect of the present invention. Further, in view of the reaction rate upon polymerization, it is not more than 7.5 parts by weight, preferably not more than 7.0 parts by weight, and more preferably not more than 6.0 parts by weight.

Moreover, within the range where the effects of the present invention are not damaged, the monomer may contain, in addition to 2,6-dimethylphenol and ortho cresol, a phenol compound represented by the following formula (2):

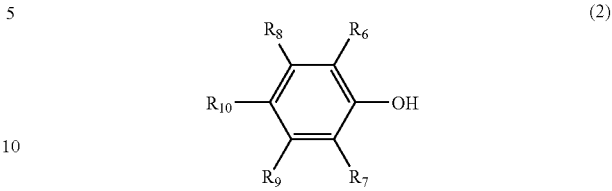

wherein $R_6$, $R_7$, $R_8$, $R_9$ and $R_{10}$ each independently represents an alkyl group, a substituted alkyl group, an aralkyl group, a substituted aralkyl group, an aryl group, a substituted aryl group, an alkoxy group, a substituted alkoxy group, halogen or a hydrogen, with the proviso that a compound wherein $R_6$ and $R_7$ are a methyl group and $R_8$, $R_9$ and $R_{10}$ are hydrogen and a compound wherein $R_6$ is a methyl group and $R_7$, $R_8$, $R_9$ and $R_{10}$ are hydrogen are excluded.

Examples of the compound include 2,3,6-trimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2,6-diphenylphenol, 2,6-bis-(4-fluorophenyl)phenol, 2-methyl-6-tolylphenol, 2,6-ditolylphenol, phenol, m-cresol, p-cresol, 2,4-dimethylphenol, 2-ethylphenol and 2,4,6-trimethylphenol.

No particular limitation is imposed on the method of feeding the above-mentioned monomer to a reactor. There are exemplified a method comprising feeding ortho cresol-containing 2,6-dimethylphenol, a method comprising feeding a monomer prepared by adding ortho cresol to 2,6-dimethylphenol, a method comprising feeding 2,6-dimethylphenol and ortho cresol separately to the reactor, and the like.

The monomer may be fed with or without dissolving it in a polymerization solvent either all at once or in several batches or in a continuous manner. The following methods can be preferably employed:

(a) a method comprising preparing a mixture of the above-mentioned monomer, and feeding it all at once at the beginning of polymerization;

(b) a method comprising preparing a mixture of the above-mentioned monomer, feeding a part at the beginning of polymerization and feeding the rest little by little during the polymerization;

(c) a method comprising preparing a mixture of all of the ortho cresol and a part of the 2,6-dimethylphenol, feeding the mixture all at once at the beginning of polymerization and feeding the rest of the 2,6-dimethylphenol little by little during the polymerization;

(d) a method comprising preparing a mixture of a part of the ortho cresol and all of the 2,6-dimethylphenol, feeding the mixture all at once at the beginning of polymerization and feeding the rest of the ortho cresol little by little during the polymerization;

(e) a method comprising feeding the 2,6-dimethylphenol all at once at the beginning of the polymerization and feeding the ortho cresol little by little during the polymerization; and (f) a method comprising feeding the ortho cresol all at once at the beginning of the polymerization and feeding the 2,6-dimethylphenol little by little during the polymerization.

The polyphenylene ether of the present invention can be obtained by polymerization of the above-mentioned monomer in the presence of a catalyst and oxygen-containing gas.

The polyphenylene ether preferably has a ratio of weight average molecular weight (Mw) in terms of polystyrene and number average molecular weight (Mn) of 2.8-8.0. These molecular weights are determined using a working curve of standard polystyrene with gel permeation chromatography. The ratio of Mw/Mn is more preferably 3.0-8.0, and particularly preferably 4.0-6.6.

The catalyst of the present invention preferably comprises a copper compound, a halogen compound and a diamine compound represented by the following formula (1):

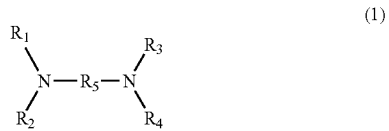

wherein $R_1$, $R_2$, $R_3$ and $R_4$ each independently represents hydrogen or a linear or branched $C_{1-6}$ alkyl group, with the proviso that they do not represent hydrogen at the same time; and $R_5$ represents a linear or methyl-branched $C_{2-5}$ alkylene group.

Examples of the copper compound mentioned herein as a catalyst component will be described. As the preferred copper compound, cuprous compounds, cupric compounds and mixtures thereof can be used. The cupric compounds include cupric chloride, cupric bromide, cupric sulfate and cupric nitrate, while the cuprous compounds include cuprous chloride, cuprous bromide, cuprous sulfate and cuprous nitrate. Of these cuprous and cupric compounds, particularly preferred are cuprous chloride, cupric chloride, cuprous bromide and cupric bromide. These copper salts may be synthesized upon use from oxides, carbonates or hydroxides of copper, and halogens or acids corresponding thereto. Methods of mixing cuprous oxide and a hydrogen halide (or a solution of a hydrogen halide) are frequently used for the preparation of such copper salts.

Examples of the halogen compound include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide and tetraethylammonium iodide. These halogen compounds can be used as an aqueous solution or a solution in a proper solvent. These halogen compounds can be used either individually or in combination with two or more thereof. Preferred halogen compounds are an aqueous solution of hydrogen chloride and an aqueous solution of hydrogen bromide.

Although no particular limitation is imposed on the amount of these compounds, they can be employed so that the copper atom would preferably be from 0.02 to 0.6 mole per 100 moles of the phenol compound, and the amount of the halogen atom would preferably be from 2 to 20 times of mole of the copper atom.

Examples of the diamine compound as the catalytic component will next be enumerated. Examples thereof include N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N-diethylethylenediamine, N,N'-diethylethylenediamine, N-ethylethylenediamine, N,N-dimethyl-N'-ethylethylenediamine, N,N'-dimethyl-N-ethylethylenediamine, N-n-propylethylenediamine, N,N'-n-propylethylenediamine, N-i-propylethylenediamine, N,N'-i-propylethylenediamine, N-n-butylethylenediamine, N,N'-n-butylethylenediamine, N-i-butylethylenediamine, N,N'-i-butylethylenediamine, N-t-butylethylenediamine, N,N'-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane and N,N,N',N'-tetramethyl-1,5-diaminopentane. Preferred diamine compounds are those in which the alkylene group that links the two nitrogen atoms has 2 or 3 carbon atoms. Although no particular limitation is imposed on the amount of the diamine compound used, it is usually employed in an amount ranging from 0.01 to 10 moles per 100 moles of the phenol compound.

To these catalyst components, it is preferable that tertiary monoamine and secondary monoamine compounds are added either individually or in combination as a catalyst component in the present invention.

The term "tertiary monoamine compounds" means aliphatic tertiary amines including alicyclic tertiary amines. Examples thereof include trimethylamine, triethylamine, tripropylamine, tributylamine, triisobutylamine, dimethylethylamine, dimethylpropylamine, aryldiethylamine, dimethyl-n-butylamine, diethylisopropylamine and N-methylcyclohexylamine. These tertiary monoamines can be used either individually or in combination of at least two or more thereof. Although no particular limitation is imposed on the amount used, it is preferably employed in an amount ranging from 0.1 to 10 moles per 100 moles of the phenol compound.

With regard to the secondary monoamine compounds, examples of secondary aliphatic amines include dimethylamine, diethylamine, di-n-propylamine, di-isopropylamine, di-n-butylamine, di-isobutylamine, di-tert-butylamine, dipentylamines, dihexylamines, dioctylamines, didecylamines, dibenzylamines, methylethylamine, methylpropylamine, methylbutylamine and cyclohexylamine. Examples of secondary aromatic monoamines include N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline and diphenylamine. The secondary monoamine compounds are however not limited to the above-described ones. They can be used either individually or in combination of at least two or more thereof. Although no particular limitation is imposed on the amount used, it ranges preferably from 0.05 to 15 moles, and more preferably from 0.1 to 10 moles, per 100 moles of the phenol compounds.

The secondary monoamine compound and tertiary monoamine compound can be used either individually or in combination as constituents of the catalyst.

It is also preferable to add a surfactant conventionally known to have the effect of improving polymerization activity of the polymerization catalyst. For example, trioctylmethylammonium chloride known by the trade name of "Aliquat 336" or Capriquat" can be used. Its amount used is preferably within a range not exceeding 0.1 wt. % based on the total amount of the reaction mixture.

In general, in a method for obtaining a polyphenylene ether, there have been known a precipitation polymerization method, wherein a poor solvent of a polyphenylene ether is used as a polymerization solvent and a polyphenylene ether is precipitated in the form of particles in the course of polymerization; and a solution polymerization method, wherein a good solvent of a polyphenylene ether is used as a polymerization solvent and a polyphenylene ether is dissolved in the solvent. The polyphenylene ether of the present invention can be obtained by either of the methods.

The solvent preferably used in the present invention is such it dissolves a low molecular weight phenol compound and a portion or the whole of the catalyst mixture, but it is not limited thereto as long as it is not easily oxidized compared with the phenol compound which is a substance to be oxidized, and has almost no reactivity with various radicals which are presumed to be formed during the reaction. Examples of such a solvent include an aromatic hydrocarbon such as benzene, toluene, xylene and ethylbenzene; a halogenated hydrocarbon such as chloroform, methylene chloride, 1,2-dichloroethane, trichloroethane, chlorobenzene, dichlorobenzene and trichlorobenzene; and a nitro compound such as nitrobenzene. These compounds can be used as a good solvent for the polymer.

Further, there can be exemplified alcohols such as methanol, ethanol, propanol, butanol, benzylalcohol and cyclohexanol; aliphatic hydrocarbons such as pentane, hexane, heptane, cyclohexane and cycloheptane; ketones such as acetone and methylethylketone; esters such as ethyl acetate and ethyl formate; ethers such as tetrahydrofuran and diethylether; amides such as dimethyl formamide; sulfoxides such as dimethyl sulfoxide; and water.

The above-mentioned solvents can be used either singly or in combination. Examples of a frequently used solvent are a single solvent of an aromatic hydrocarbon such as toluene and xylene or a mixed solvent where alcohols such as methanol and ethanol are incorporated therein.

The process of the present invention is applicable to the polymerization method such as a batchwise polymerization method, a continuous polymerization method, a solution polymerization method and a precipitation polymerization method. It is also efficient in a non-solvent bulk polymerization method and a polymerization method carried out under the supercritical state where carbon dioxide gas is used as a solvent.

As the oxygen-containing gas used during polymerization of the present invention, not only pure oxygen, but also a mixture of oxygen and an inert gas such as nitrogen at any ratio, air, or a mixture of air and an inert gas such as nitrogen at any ratio can be used. As the pressure in the system during the polymerization reaction, normal pressure is sufficient, but the reaction may be effected under reduced pressure or under pressure as needed.

There is no particular limitation on the temperature of polymerization. Polymerization is preferably conducted at a temperature ranging from 0 to 80° C., more preferably 10 to 70° C., because reaction does not proceed smoothly at an excessively low temperature and the reaction selectivity happens to become low at an excessively high temperature.

Within the range where the effect of the present invention is not damaged, a hydroxide of an alkali metal, hydroxide of an alkaline earth metal, alkoxide of an alkali metal, a neutral salt such as a magnesium sulfate and calcium chloride, or an additive such as zeolite can be added to the polymerization reaction system.

No particular limitation is imposed on the treatment after completion of the polymerization reaction. Usually, the polyphenylene ether can be recovered according to the simple process of adding an acid such as hydrochloric acid or acetic acid, ethylenediaminetetraacetic acid (EDTA) or a salt thereof, or nitrilotriacetic acid or a salt thereof to the reaction mixture to deactivate the catalyst, separating the produced polymer and washing the polymer with a solvent that does not dissolve the polymer, such as methanol followed by drying.

As the flame retardant used in the present invention, any one which is generally used to impart a flame retardant property to a flammable thermoplastic resin can be used. For example, a halogen, silicone or phosphorous type flame retardant can be used.

Examples of the halogen type flame retardant include an aromatic halogen compound, a halogenated aromatic polymer and a halogenated cyanurate resin; preferably a brominated bisphenol epoxy resin, a brominated bisphenol phenoxy resin, a brominated bisphenol polycarbonate resin, a brominated polystyrene resin, a brominated cross-linked polystyrene resin, a brominated bisphenol cyanurate resin, a brominated polyphenylene ether, decabromo diphenyl oxide, tetrabromo bisphenol-A and an oligomer thereof, a brominated alkyl triazine compound, or the like.

As the silicone type flame retardant, there can be exemplified (poly)organosiloxanes, which include monoorganosiloxanes such as dimethyl siloxane and phenyl methyl siloxane and organopolysiloxanes such as polydimethyl siloxane and polyphenyl methyl siloxane, which are obtained by polymerizing the mono-organosiloxanes and a copolymer thereof. In the case of (poly)organosiloxanes, bonding groups of the main or branched side chain are hydrogen or a hydrocarbon group, preferably a phenyl group, a methyl group, an ethyl group or a propyl group, but other hydrocarbon groups may be used. A terminal bonding group can be any of a hydroxyl group, an alkoxy group and a hydrocarbon group.

The form of the silicones is not particularly limited and can be used in an arbitrary form such as an oil, a gum, a varnish, a powder or a pellet.

The phosphorus type flame retardants include red phosphorus as phosphorus, and phosphazene compounds having a bonding of a phosphorus atom and a nitrogen atom in the main chain thereof as a phosphorus compound. The phosphazene compounds include propoxy phosphazene, phenoxy phosphazene, amino phosphazene, fluoroalkyl phosphazene and the like. They can be used either singly or in combination. A mixture of cyclic phosphazene and linear phosphazene can be also used. These phosphazene compounds are synthesized in general by substituting chlorophosphazene with phenol and the like.

Further, there can be exemplified as phosphate ester type flame retardant phosphate esters, trimethylphosphate, triethylphosphate, tripropylphosphate, tributylphosphate, tripentylphosphate, trihexylphosphate, tricyclohexylphosphate, triphenylphosphate, tricresylphosphate, trixylenylphosphate, cresyldiphenylphosphate, dicresylphenylphosphate, dimethylethylphosphate, methyldibutylphosphate, ethyldipropylphosphate, hydroxyphenyldiphenylphosphate, resolsinol bisdiphenylphosphate; compounds obtained by modifying the phosphate esters with various substituents; and various condensed type phosphate ester compounds. Among them, a condensed phosphate ester compound is preferable.

Particularly preferred is a phosphate ester represented by the following formula (3):

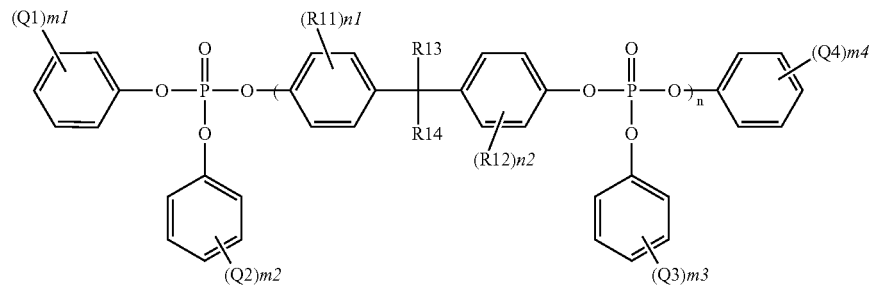

wherein Q1, Q2, Q3 and Q4 each represents an alkyl group having 1-6 carbon atoms or hydrogen; R11, R12, R13 and R14 each represents a methyl group or hydrogen; n is an integer of 1 or more; each of n1 and n2 is an integer of 0-2; and each of m1, m2, m3 and m4 is an integer of 1-3.

In the formula (3), particularly preferred for Q1, Q2, Q3 and Q4 is hydrogen or a methyl group.

In the formula (3), preferred for R11 and R12 is hydrogen and for R13 and R14 is a methyl group.

In the formula (3), n is an integer of 1 or more and the heat resistance and workability of the phosphate ester change depending on the number of n. A preferable range of n is 1-5. The phosphate ester can be a mixture of those having various n values.

The above phosphate esters can be used either singly or in combination.

For the purpose of further improvement of flame retardancy, there can be added a variety of well-known flame retardants and auxiliary flame retardants, for example, a nitrogen-containing cyclic compound, specifically a compound with a triazine skeleton such as melamine, anmeride, anmerine, benzoguanamine, succinoguanamine, melaminecyanulate, melame, meleme, metone and melone and a sulfate salt thereof; a hydroxide of an alkali metal or an alkali earth metal having crystallization water such as magnesium hydroxide and aluminum hydroxide; zinc borate; and zinc stannate.

The styrene resin used in the present invention is a polymer obtained by the polymerization of a styrene compound or a compound copolymerizable therewith in the presence or absence of a rubber-like polymer.

Examples of the styrene compound include styrene, α-methylstyrene, 2,4-dimethylstyrene, monochlorostyrene, p-methylstyrene, p-tert-butylstyrene, ethylstyrene, and the like. Most preferred is styrene. The compounds copolymerizable with the styrene compound include methacrylic acid esters such as methyl methacrylate and ethyl methacrylate; unsaturated nitrile compounds such as acrylonitrile and methacrylonitrile; acid anhydrides such as maleic anhydride; and the like. These compounds are used together with the styrene compound. The amount of the copolymerizable compounds is preferably not more than 20% by weight, and more preferably not more than 15% by weight based on the total amount of the copolymerizable compound and the styrene compound.

The rubber-like polymers include, for example, conjugated diene rubbers, copolymers of a conjugated diene and an aromatic vinyl compound, ethylene-propylene copolymer rubbers, and the like. Polybutadiene and styrene-butadiene copolymer are especially preferred. In the case of using unsaturated rubber-like polymers, it is preferred to use partially hydrogenated rubbers. Examples of the styrene resins include polystyrene and rubber-reinforced polystyrene, styrene-acrylonitrile copolymer (AS resin) and rubber-reinforced styrene-acrylonitrile copolymer (ABS resin), and other styrene copolymers. Polystyrene and rubber-modified polystyrene are particularly preferred.

The composition of the present invention can include other additives such as stabilizers like antioxidants and ultraviolet absorbers, antistatic agents, releasing agents, dyes and pigments or other resins within the range that the effect of the present invention has not been damaged.

The method for producing the resin composition of the present invention is not particularly limited, and the composition can be produced by kneading with kneading machines such as extruders, heating rolls, kneaders and Banbury mixers. Among them, kneading by extruders is preferred from the point of productivity. The kneading temperature can depend on the preferred processing temperature of the base resin, and is in the range of 200-360° C., preferably 240-320° C. as a standard.

EXAMPLES

Hereinafter, the present invention will be explained referring to the following examples. The present invention shall not be limited to these examples.

(1) General Procedure of Polymerization

In a 10 liter jacketed SUS-made reactor having, at its bottom, a sparger for introducing an oxygen-containing gas, an agitating turbine blade and a reflux condenser, the catalyst components and a portion of toluene were charged. Then, an oxygen-containing gas was fed from the sparger, the point of which was defined as the polymerization initiation time. Immediately after the introduction of the gas, a solution prepared by dissolving the rest (or the whole) of the monomer in toluene was charged into the reactor over 30 minutes using a pump. The amount of each component charged into the reactor by the completion of charging was defined as a calculated amount (charged amount) based on the total amount of the whole charged components. Polymerization was continued for 90 minutes. An aqueous solution of tripotassium salt of EDTA was added to the resultant reaction mixture, followed by stirring. Then, an equal volume of methanol to the aqueous solution was added to precipitate a polymer. The precipitated polymer was filtered and washed three times with methanol, and then vacuum-dried at 145° C. for 1 hour. The molecular weight distribution of the dried polymer was measured.

(2) Molecular Weight Distribution of Polyphenylene Ether

The molecular weight distribution was determined using a working curve which was obtained from standard polystyrene samples with a gel permeation chromatography (hereinafter "GPC"), "System 21" manufactured by Showa Denko K.K. The standard polystyrene samples used above had a molecular weight of 550, 1,300, 2,960, 9,680, 28,600, 65,900, 172,000, 629,000, 1,960,000 and 3,900,000. The chromatographic columns (linear column "K-805L" manufactured by Showa Denko K.K.) connected in series were used. The measurement was conducted using chloroform as a solvent with a flow rate of 1.00 ml/min at a column temperature of 40° C. The wavelength of ultraviolet rays in a detector was 254 nm for a standard polystyrene samples and 283 nm for the polyphenylene ether resin.

(3) Preparation of Resin Composition

Each component shown in Table 2 was melt-kneaded using a twin screw extruder equipped with a vent port, ZSK-25 (manufactured by Werner-Pfleiderer, Germany), under the conditions of an extrusion temperature of 320° C., a screw rotation speed of 300 rpm, and an extrusion rate of 12 kg/hr to obtain a pellet. The resultant pellet was supplied to a screw-in-lined type injection molding machine (manufactured by Toshiba Corporation) set at a temperature of 240° C., and the injection molding pressure was measured at a mold temperature of 60° C.

(4) Flammability Test: UL 94/Vertical Positioning

Five specimens having a thickness of 1/16 inches (1.6 mm) were evaluated by a vertical positioning flammability test, which was carried out according to a flammability testing for classifications of materials of Underwriters Laboratories Inc. (UL-94 test). In each Example and Comparative Example, flame retardancy was evaluated by the total burning time (seconds) of 10 time ignitions and presence or absence of a dropping. The level of the flammability was rated as V-0, which was the most excellent, followed by V-1 and V-2 in descending order. In case the total burning time was over 250 seconds, it was rated as out of rank.

Comparative Example 1

The reactor described as in "General procedure of polymerization" above was fully filled with nitrogen, and a mixture of 0.8374 g of cuprous oxide and 5.0371 g of a 47% aqueous solution of hydrogen bromide was charged. Then, 2.0173 g of N,N'-di-t-butylethylenediamine, 9.7664 g of di-n-butylamine, 24.7706 g of butyldimethylamine, 1.0 g of trioctylmethylammonium chloride and 3656.5712 g of toluene were charged therein. A mixed gas of oxygen and nitrogen was introduced into the reactor, and immediately a solution of 650 g of 2,6-dimethylphenol (containing 100 ppm of ortho cresol) dissolved in 650 g of toluene was fed at a temperature of 40° C. using a plunger pump over 30 minutes. Polymerization was continued for 90 minutes. After the polymerization was completed, 500 g of a 1.83% aqueous solution of a tripotassium salt of EDTA was added to the resultant reaction mixture, followed by stirring for 150 minutes at a temperature of 70° C. Methanol was added in an equal volume to precipitate a polymer. The precipitated polymer was filtered, washed three times with methanol, and then vacuum-dried at 145° C. for 1 hour. The dried polymer was measured using GPC to obtain a ratio of weight average molecular weight (Mw) and number average molecular weight (Mn). The ratio of Mw/Mn was 2.69. Using the resultant polyphenylene ether, the resin composition shown in Table 2 was melt-kneaded and evaluated.

Comparative Example 2

The same method as in Comparative Example 1 was repeated except that a solution of 650 g of 2,6-dimethylphenol dissolved in 650 g of toluene was fed using a plunger pump over 20 minutes. The ratio of Mw/Mn was 2.75.

Comparative Example 3

The same method as in Comparative Example 1 was repeated except that a solution of 650 g of 2,6-dimethylphenol dissolved in 650 g of toluene was fed using a plunger pump over 40 minutes. The ratio of Mw/Mn was 2.65.

Example 1

The same method as in Comparative Example 1 was repeated except that a solution of 643.5 g of 2,6-dimethylphenol and 6.5 g of ortho cresol dissolved in 650 g of toluene was fed using a plunger pump over 30 minutes. The ratio of Mw/Mn was 3.02.

Example 2

The same method as in Example 1 was repeated except that a solution of 631 g of 2,6-dimethylphenol and 19 g of ortho cresol dissolved in 650 g of toluene was fed using a plunger pump over 30 minutes and the polymerization time was changed to 120 minutes. The ratio of Mw/Mn was 4.07.

Example 3

The same method as in Example 1 was repeated except that a solution of 619 g of 2,6-dimethylphenol and 31 g of ortho cresol dissolved in 650 g of toluene was fed using a plunger pump over 30 minutes and the polymerization time was changed to 130 minutes. The ratio of Mw/Mn was 5.30.

Example 4

The same method as in Example 2 was repeated except that a solution of 605 g of 2,6-dimethylphenol and 45 g of ortho cresol dissolved in 650 g of toluene was fed using a plunger pump over 30 minutes and the polymerization time was changed to 140 minutes. The ratio of Mw/Mn was 8.00.

Comparative Example 4

The same method as in Comparative Example 1 was repeated except that a solution of 650 g of 2,6-dimethylphenol containing 2000 ppm of ortho cresol dissolved in 650 g of toluene was fed. The ratio of Mw/Mn was 2.70.

TABLE 1

| | Amount of Ortho Cresol (wt. %) | Molecular Weight Distribution |
|---|---|---|
| Ex. 1 | 1.01 | 3.02 |
| Ex. 2 | 3 | 4.07 |
| Ex. 3 | 5 | 5.30 |
| Ex. 4 | 7 | 8.00 |
| Comp. Ex. 1 | 0.01 | 2.69 |
| Comp. Ex. 4 | 0.2 | 2.69 |

TABLE 2

| | Component | 1 | 2 | 3 | 4 | 5 | 6 | 7 | 8 | 9 | 10 | 11 | 12 | 13 |
|---|---|---|---|---|---|---|---|---|---|---|---|---|---|---|
| Composition | PPE Comp. Ex. 1 | 40 | 39.18 | 39.65 | | | | | | | | | | |
| | Ex. 1 | | | | 40 | 39.18 | 39.65 | | | | | | | |
| | Comp. Ex. 2 | | | | | | | 40 | | | | | | |
| | Comp. Ex. 3 | | | | | | | | 40 | | | | | |
| | Ex. 2 | | | | | | | | | 40 | | | | |
| | Ex. 3 | | | | | | | | | | 40 | | | |
| | Ex. 4 | | | | | | | | | | | 40 | 39.18 | 39.65 |
| | HIPS (b) | 30 | 29.38 | 29.73 | 30 | 29.38 | 29.73 | 30 | 30 | 30 | 30 | 30 | 29.38 | 29.73 |
| | GPPS (c) | 18.5 | 18.12 | 18.33 | 18.5 | 18.12 | 18.33 | 18.5 | 18.5 | 18.5 | 18.5 | 18.5 | 18.12 | 18.33 |
| | Additive (d) | 0.5 | 0.49 | 0.5 | 0.5 | 0.49 | 0.5 | 0.5 | 0.5 | 0.5 | 0.5 | 0.5 | 0.49 | 0.5 |
| | Flame Retardant (e) | 11 | | | 11 | | | 11 | 11 | 11 | 11 | 11 | | |
| | Flame Retardant (f) | | 12.83 | | | 12.83 | | | | | | | 12.83 | |
| | Flame Retardant (g) | | | 11.79 | | | 11.79 | | | | | | | 11.79 |
| Result | Flame Retarding Test | | | | | | | | | | | | | |
| | Total Burning Time (sec) | 122 | 128 | 125 | 168 | 136 | 128 | 126 | 123 | 128 | 88 | 76 | 92 | 85 |
| | Dripping | YES | YES | YES | NO | NO | NO | YES | YES | NO | NO | NO | NO | NO |
| | Flame Retardancy Level | V-2 | V-2 | V-2 | V-1 | V-1 | V-1 | V-2 | V-2 | V-1 | V-0 | V-0 | V-0 | V-0 |
| | Fluidity | | | | | | | | | | | | | |
| | Injection Molding Pressure (kg/cm$^2$) | 63 | 63 | 65 | 60 | 63 | 61 | 62 | 66 | 59 | 56 | 53 | 54 | 53 |

(a) Parts by weight
(b) Rubber modified polystyrene
(c) General purpose polystyrene
(d) Blend of Zinc oxide, Zinc sulfide and HIPS
(e) Flame retardant/bisphenol A-bis (diphenyl phosphate), manufactured by Daihachi Chemical Industry Co, Ltd.
(f) Flame retardant/resorcynol-bis(diphenyl phosphate), manufactured by Daihachi Chemical Industry Co, Ltd.
(g) Flame retardant/triphenyl phosphate, manufactured by Daihachi Chemical Industry Co, Ltd.

The present invention has been described in detail with reference to specific embodiments thereof. It will be apparent to one skilled in the art that various changes and modifications can be made therein without departing from the spirit and scope of this invention.

The present application is based on Japanese patent applications (Japanese Patent Application Nos. 2002-208583 and 2002-208584) filed on Jul. 17, 2002 and the content thereof is expressly incorporated herein by reference.

INDUSTRIAL APPLICABILITY

By the present invention, a polyphenylene ether having a wider molecular weight distribution than has been obtained, and a flame retardant resin composition excellent in flame retardancy, particularly in anti-dripping properties upon burning, can be obtained. Further, a polyphenylene ether having good fluidity and good reactablity with other resins can be obtained.

The resin composition of the present invention is excellent in flame retardancy, particularly in anti-dripping properties upon burning. Therefore, it is applicable not only in the electric and electronic fields which require high flame retardancy, but also to other various fields needing polyphenylene ether resins.

The invention claimed is:

1. A resin composition comprising a polyphenylene ether and a flame retardant, wherein said polyphenylene ether is obtained by polymerizing a monomer comprising 100 parts by weight of 2,6-dimethylphenol and from 3 to 7% by weight of ortho cresol in the presence of a catalyst and an oxygen-containing gas.

2. The resin composition according to claim 1, wherein said polyphenylene ether has a molecular weight distribution of 2.8-8.0.

3. The resin composition according to claim 1 wherein said resin composition further includes a styrene resin.

4. The resin composition according to claim 3, which comprises from 5-95 parts by weight of the polyphenylene ether, from 95-5 parts by weight of the styrene resin and from 1-30 parts by weight, based on 100 parts by weight of the polyphenylene ether and the styrene resin, of the flame retardant.

5. The resin composition according to claim 1, wherein said flame retardant is at least one compound selected from the group consisting of a halogen compound, a silicone compound and a phosphorous compound.

6. A process for producing a resin composition comprising a polyphenylene ether and a flame retardant, which comprising:

polymerizing a monomer comprising 100 parts by weight of 2,6-dimethylphenol and from 3 to 7% by weight of ortho cresol in the presence of a catalyst and an oxygen-containing gas to obtain a polyphenylene ether, and mixing said polyphenylene ether with a flame retardant.

7. The process according to claim 6, wherein said monomer is 2,6-dimethylphenol containing ortho cresol.

8. The process according to claim 6, wherein said 2,6-dimethylphenol and said ortho cresol are separately fed.

9. The process according to claim 6, wherein said catalyst comprises a copper compound, a halogen compound and a diamine compound represented by the following formula (1):

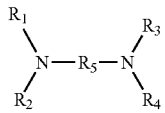

wherein $R_1$, $R_2$, $R_3$ and $R_4$ each independently represents a hydrogen or a linear or branched $C_{1-6}$ alkyl group, with the proviso that they do not represent hydrogen at the same time; and $R_5$ represents a linear or methyl-branched $C_{2-5}$ alkylene group.

10. The process according to claim 9, wherein said catalyst further comprises at least one of a tertiary monoamine compound or a secondary monoamine compound.

11. A polyphenylene ether having a molecular weight distribution of from 2.8-8.0, which is obtained by polymerizing a monomer comprising 100 parts by weight of 2,6-dimethylphenol and from 3 to 7% by weight of ortho cresol in the presence of an oxygen-containing gas and a catalyst comprising a copper compound, a halogen compound and a diamine compound represented by the following formula (1):

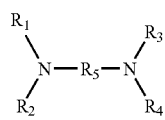

wherein $R_1$, $R_2$, $R_3$ and $R_4$ each independently represents a hydrogen or a linear or branched $C_{1-6}$ alkyl group, with the proviso that they do not represent hydrogen at the same time; and $R_5$ represents a linear or methyl-branched $C_{2-5}$ alkylene group.

* * * * *